(12) United States Patent
Bathiche

(10) Patent No.: US 7,256,768 B2
(45) Date of Patent: Aug. 14, 2007

(54) COMPUTER KEYBOARD WITH QUANTITATIVELY FORCE-SENSING KEYS

(75) Inventor: Steven N. Bathiche, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 382 days.

(21) Appl. No.: 10/662,459

(22) Filed: Sep. 16, 2003

(65) Prior Publication Data

US 2005/0057515 A1 Mar. 17, 2005

(51) Int. Cl.
*G09G 5/00* (2006.01)
(52) U.S. Cl. ...................................... 345/168; 345/172
(58) Field of Classification Search ............ 345/168–9, 345/168, 169, 172–3, 172, 173, 182, 183
See application file for complete search history.

(56) References Cited

U.S. PATENT DOCUMENTS

| | | | |
|---|---|---|---|
| 3,806,471 A | 4/1974 | Mitchell | |
| 4,296,406 A | 10/1981 | Pearson | |
| 4,314,227 A | 2/1982 | Eventoff | |
| 4,489,302 A | 12/1984 | Eventoff | |
| 5,008,497 A | 4/1991 | Asher | |
| 5,063,376 A | 11/1991 | Chang | |
| 5,231,386 A | 7/1993 | Brandenburg et al. | |
| 5,276,794 A | 1/1994 | Lamb, Jr. | |
| 5,302,936 A | 4/1994 | Yaniger | |
| 5,349,873 A * | 9/1994 | Omura et al. ............ 73/862.68 |
| 5,515,044 A | 5/1996 | Glatt | |
| 5,675,329 A * | 10/1997 | Barker et al. ................. 341/22 |
| 5,995,026 A | 11/1999 | Sellers | |
| 5,996,026 A | 11/1999 | Sellers | |
| 5,999,084 A | 12/1999 | Armstrong | |
| 6,102,802 A | 8/2000 | Armstrong | |
| 6,135,886 A | 10/2000 | Armstrong | |
| 6,198,474 B1 | 3/2001 | Roylance | |

(Continued)

FOREIGN PATENT DOCUMENTS

GB 1 255 761 12/1971

OTHER PUBLICATIONS

Eric Gray, "The Synclavier Digital Audio System: Recent Developments in Audio Post-Production," New England Digital, Mar. 1987.

(Continued)

*Primary Examiner*—Jimmy H. Nguyen
*Assistant Examiner*—Tammy Pham
(74) *Attorney, Agent, or Firm*—Banner & Witcoff, Ltd.

(57) ABSTRACT

A computer keyboard has a grid of conductors forming a plurality of intersections, with force-sensitive resistor (FSR) elements located between the conductors at the intersections. A plurality of keys are located above the intersections and exert force on the conductors and FSR elements during key presses. A resistor network sub-circuit is connected to some of the conductors, and is switchable between low and high resistance values. An Analog to Digital Converter (ADC) is coupled to the resistor network sub-circuit. A microprocessor grounds a conductor and tests another conductor for a threshold voltage level while the resistor network is switched to the high resistance value. The microprocessor switches the resistor network to the low resistance value upon detecting the threshold voltage level and subsequently receives from the ADC a digital value of a voltage on the tested conductor.

20 Claims, 16 Drawing Sheets

U.S. PATENT DOCUMENTS

| | | | |
|---|---|---|---|
| 6,204,839 B1 | 3/2001 | Mato, Jr. | |
| 6,343,991 B1 | 2/2002 | Armstrong | |
| 6,347,997 B1 | 2/2002 | Armstrong | |
| 6,492,979 B1 | 12/2002 | Kent et al. | |
| 6,504,492 B1 | 1/2003 | Muurinen | |
| 6,559,831 B1 | 5/2003 | Armstrong | |
| 6,563,415 B2 | 5/2003 | Armstrong | |
| 6,563,434 B1 * | 5/2003 | Olodort et al. | 341/22 |
| 6,758,615 B2 | 7/2004 | Monney et al. | |
| 2002/0104369 A1 | 8/2002 | Baker et al. | |
| 2002/0154038 A1 | 10/2002 | Houston | |

OTHER PUBLICATIONS

R.D. Harrod, "Touch-Pressure Sensitive Frequency-Modulated Keyboard," IBM Technical Disclosure Bulletin, vol. 20, No. 10, pp. 4039-4040, Mar. 1978.

Joyce et al., "Identity Authentication Based on Keystroke Latencies," Communications of the ACM, vol. 33, No. 2, pp. 168-176, Feb. 1990.

Lieberman et al., "Casio CZ-1 Digital Synthesizer: A User's Report," Computer Music Journal, pp. 86-88, Spring 1987.

Popovich et al., "Gradient formation in a micro-processor-based HPLC system," American Laboratory, pp. 136-139, May 1981.

H. Tang, "A multilevel input system with force-sensitive elements," Int. J. Human-Computer Studies, 2001 (54), pp. 495-507, Apr. 2001.

Office Action dated Feb. 8, 2006 for U.S. Appl. No. 10/662,398.

* cited by examiner

COMPUTER KEYBOARD WITH QUANTITATIVELY FORCE-SENSING KEYS

CROSS-REFERENCES TO RELATED APPLICATIONS

This application is related to the U.S. patent application titled "Quantitatively Force-Sensing Computer Keyboard," filed simultaneously herewith and having attorney docket number 3797.00547, the disclosure of which is hereby incorporated by reference.

FIELD OF THE INVENTION

This invention relates to computer keyboards. More specifically, this invention relates to computer keyboards having multiple keys capable of quantitatively sensing the force exerted upon those keys.

BACKGROUND OF THE INVENTION

As more and more uses are found for computers, and as existing uses are augmented and improved, it is often necessary to provide increasing amounts of input to computers. Numerous input mechanisms already exist, and additional mechanisms continue to be developed. For many purposes, however, the computer keyboard remains the primary computer input device. As such, there are numerous possible advantages to increasing the amount of data that a user can input to a computer via a keyboard. As used herein, "keyboard" includes, but is not limited to, "QWERTY" computer keyboards as described by, e.g., International Standard ISO/IEC 9995-1 and other standards.

One manner of increasing the data which a keyboard can input is by increasing the number of keys. For example, many keyboards contain standard function keys (e.g., F1, F2, etc.). Some keyboards have application-specific keys in addition to the common character and function keys; examples include separate keys which a user presses to connect to the Internet, etc. There are practical limits on the number of keys that can be added, however. If the keys become too numerous, some of the keys may be difficult to reach, and users may have difficulty remembering the purposes of all keys.

As another alternative, additional functions can be added to existing keys. For example, many keyboards are configured so that certain keys generate a first signal if a key is pressed in isolation and another signal if the key is pressed in combination with a "modifier" key (e.g., the CTRL, ALT and SHIFT keys). Although it is possible to add additional modifier keys so as to assign even more possible functions to existing keys, this also has practical limits. Users are unlikely to remember all functions corresponding to all possible key combinations, and software developers are often unlikely to uniformly assign the same function to a particular key combination.

Force-sensing keys offer an advantageous way to increase the amount of data that a user can input with a computer keyboard. In most existing keyboards, a given key can only have two states; the key is either pressed (i.e., it is "down") or it is not pressed (i.e., it is "up"). Because of this, a single key can only generate two values. A force-sensing key, on the other hand, can generate (or cause the generation of) a range of values corresponding to the amount of force exerted on the key. Pressing the key lightly may generate one signal, pressing slightly harder may generate another signal, pressing even harder may generate a third signal, etc. The additional signals can then be given meanings related to a character or function assigned to the key.

No known prior art has addressed many of the challenges such a keyboard presents. For example, computer keyboards typically operate by scanning each key to detect a key press. An entire keyboard is often scanned hundreds of times per second, and a typical computer keyboard can have over 100 keys. Once all keys are scanned and one or more depressed keys detected, a data message must be generated and transmitted to a computer. Substantial processing is thereby required. Determining how hard a key has been pressed (as opposed to simply determining if the key is pressed or not pressed) requires additional processing, and thus additional time. If each of the keys must be scanned to determine how hard a key may have been pressed, completing a scan could require an unacceptably long time. Although using a higher speed processor is one possible solution, this can increase cost.

SUMMARY OF THE INVENTION

The present invention addresses the above and other challenges associated with providing a keyboard with one or more force-sensing keys. In one embodiment, the invention includes a computer keyboard having a plurality of keys. Each of the keys has an unpressed condition in which a user is not exerting force on the key and a pressed condition in which the user is exerting force on the key. The keyboard further includes a force detection circuit configured to scan each key to determine if a scanned key is in a pressed condition. The force detection circuit quantifies, upon determining that a scanned key is in a pressed condition, the force exerted by a user on that pressed key. If a scanned key is not in a pressed condition, the force detection circuit proceeds to another key without attempting to determine a force exerted on an unpressed key.

In another embodiment, the invention includes a computer keyboard having a grid of a first group of conductors and a second group of conductors. The first and second group conductors form a plurality of intersections. A force-sensitive resistor element is located at each intersection between the first and second group conductors forming the intersection. A plurality of keys are located above the intersections, each key being associated with an intersection and configured to exert force on the conductors and force-sensitive resistor element of the intersection during a key press. The keyboard further includes a microprocessor having a plurality of first group conductor pins, each pin being in contact with one of the first group conductors. The microprocessor also includes a plurality of second group conductor pins, each pin being in contact with one of the second group conductors. The keyboard additionally includes a sub-circuit connected to at least one of the second group conductors. The sub-circuit has a resistor network switchable by the microprocessor between a low resistance value and a high resistance value. Finally, the keyboard of this embodiment includes an Analog to Digital Converter (ADC) coupled to the sub-circuit and to the microprocessor. In other aspects, the microprocessor is configured to ground an individual conductor pin, to test another conductor pin for a threshold voltage level while the resistor network is switched to the high resistance value, to switch the resistor network to the low resistance value upon detecting the threshold voltage level on the tested conductor pin, and to receive from the ADC a digital value of a voltage on the tested conductor pin while the resistor network has the low resistance value.

These and other features and advantages of the present invention will be readily apparent and fully understood from the following detailed description of preferred embodiments, taken in connection with the appended drawings.

DETAILED DESCRIPTION OF THE PREFERRED EMBODIMENTS

As used in the written description and claims, and unless specifically indicated otherwise, a "force-sensing" key is a computer keyboard key which, in addition to key-down (pressed) and key-up (not pressed) conditions, has intermediate conditions based on the amount of force applied to a key by a user, and which causes generation of a range of signal values corresponding to the intermediate conditions. An application software program, when operated on a computer accessed by a keyboard having one or more force-sensing keys, could use keyboard force data in numerous ways. As one example, a word processing program could be configured to change attributes of a typed character based upon how hard a user may press upon a key. By way of illustration, pressing a key with more force may cause a character to be typed in a bold-faced or larger sized font, may cause a font color to change, or may otherwise provide additional data from the user in connection with the pressed key. A game application could be configured such that increased force upon various keys could change the manner in which the game is played. A player might press one key to fire a weapon in the game, another key to move a screen image, etc. Pressing the assigned keys with increased force could cause the weapon to fire faster, the screen image to move faster, etc. As yet another example, an e-mail or Internet chat client application could be configured so that pressing various keys with increased force might permit a user to change the size, color, or other features of a message to convey a sense of emotion. By way of illustration, an angry user sending a message could type the message with more force and cause the message to be in all capital letters. Numerous other uses for key force data are possible for these and other types of applications.

Figure 1:
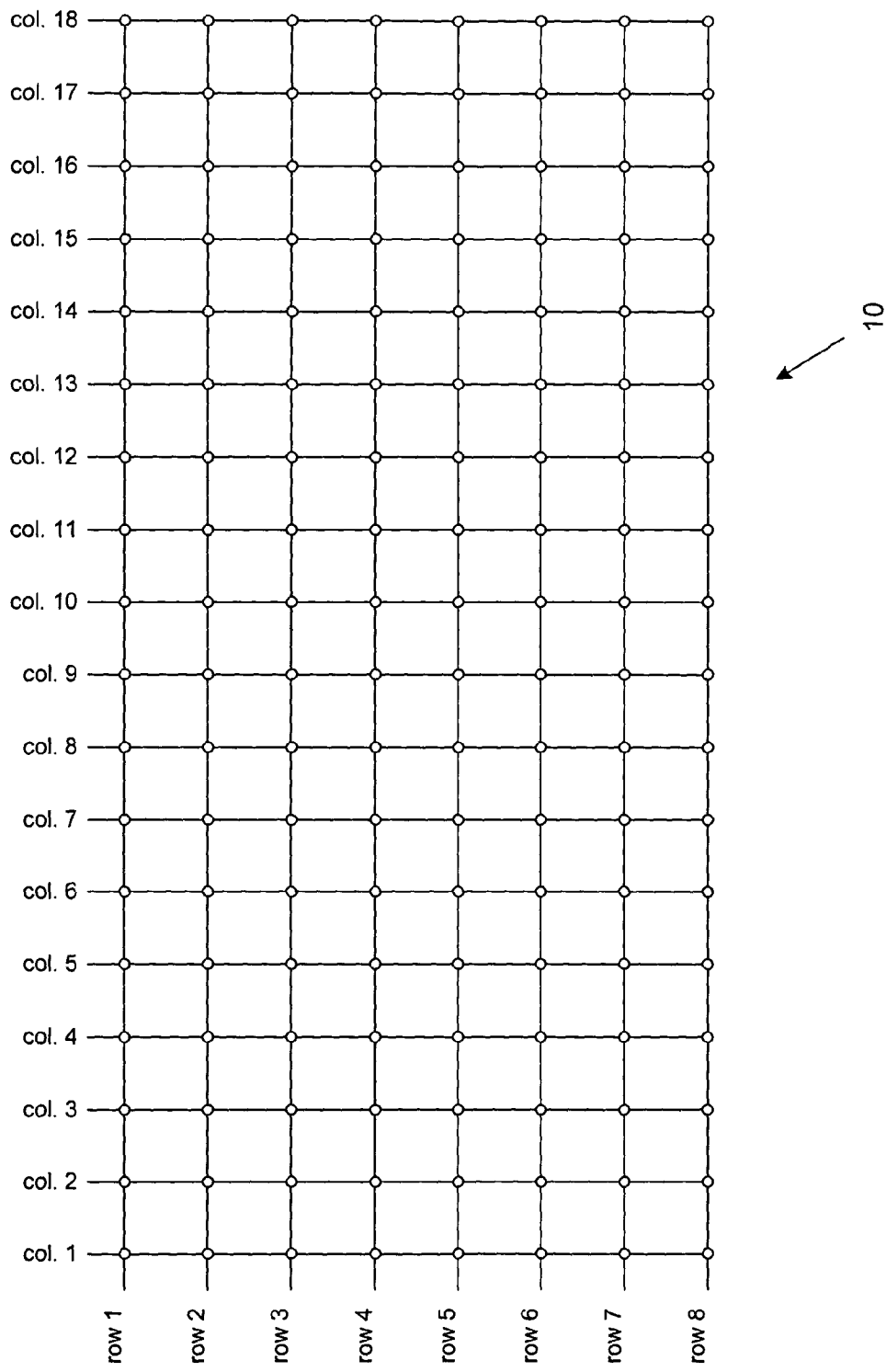
FIG. 1 is a schematic representation of a grid of row and column conductors for a keyboard according to at least one embodiment of the invention.

FIG. 1 is a schematic drawing of a grid 10 of conductors forming part of a keyboard according to at least one embodiment of the invention. Grid 10 includes multiple conductors arranged in horizontal rows, labeled in FIG. 1 as row 1, row 2, row 3, etc. Conductors forming vertical columns extend across the rows, and are labeled in FIG. 1 as col. 1, col. 2, col. 3, etc. Both the rows and the columns may be formed as conductive strips on respective sheets of MYLAR polyester film or other flexible insulating material. The rows and columns form multiple intersections, shown as open circles in FIG. 1. Each row/column intersection corresponds to a key of a keyboard. When a key is in an "up" condition (i.e., not being pressed by a user), the row and column conductors forming the intersection are electrically isolated from each other. When a user presses the key that corresponds to an intersection, an electrical connection between the row and column conductor is formed at that intersection. FIG. 1 is only intended to illustrate the general concept of a keyboard grid. For simplicity, the row and column conductors are shown in FIG. 1 as regularly arranged, perpendicular lines. In actuality, the row and column conductors may not be in straight lines, may not be perpendicular, and may otherwise be rearranged to correspond to the physical arrangement of keys on a keyboard.

In operation, a microprocessor (not shown in FIG. 1, but further described below) detects a key press in the following manner. A row is selected and a voltage applied to that row. When no key is pressed, the voltage on a row will be high. As used herein, a "high" voltage refers to the magnitude of a voltage, and not the polarity (e.g., a voltage of +5.0 volts or of −5.0 volts could be high and a voltage of +0.8 volts or of −0.8 volts could be low). While testing the voltage on the selected row, each column conductor is sequentially grounded. If a key is pressed, a connection is made between a row and a column. If the column conductor corresponding to that pressed key is grounded, the voltage on the row corresponding to that key goes low. Accordingly, if the microprocessor detects a low voltage on the selected row, the pressed key can be determined based on the selected row and the column conductor that was being grounded at the time of the low voltage detection. After grounding each column, the next row is selected, and each column is once again sequentially grounded. The process continues through the last row, after which it begins again with the first row. More than a single key may be pressed, and therefore more than a single key press detected. In other words, after detecting a key press at a row/column intersection, the microprocessor continues to test the remaining columns and rows. At the conclusion of a scan cycle in which the microprocessor tests all row/column intersections, the microprocessor generates a data message containing identifiers for the pressed keys and sends the message to a computer.

Figure 2:
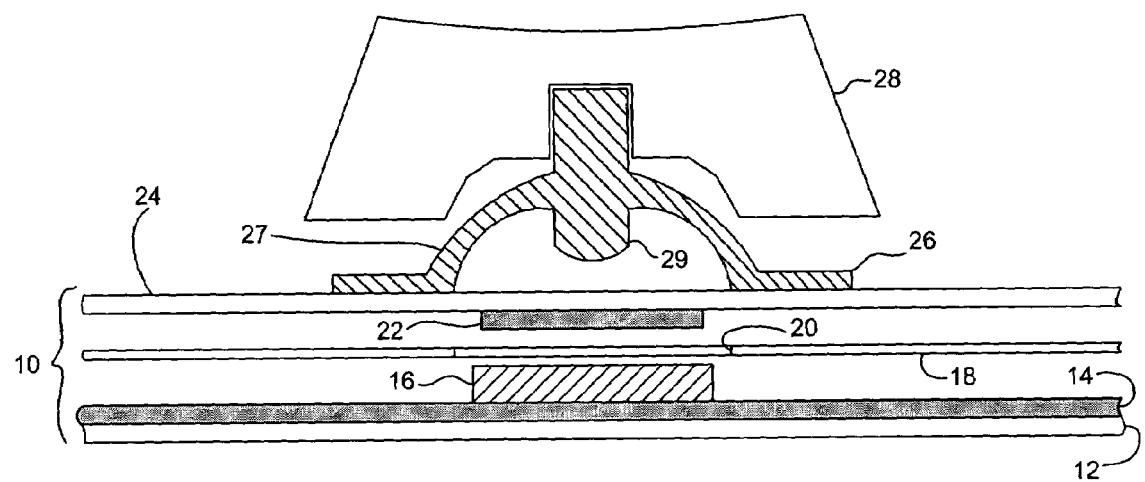
FIG. 2 is a cross section of a computer key and other keyboard components according to an embodiment of the invention.
Figure 2A:
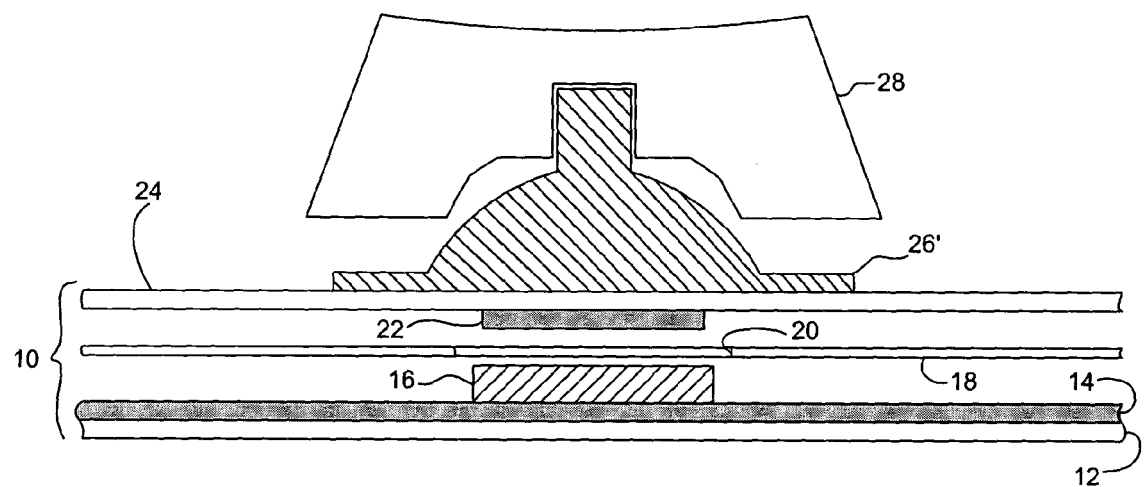
FIG. 2A is a cross section of a computer key and other components according to another embodiment of the invention.

Unlike existing keyboards, however, one or more of the row/column intersections of grid 10 are connected by a variable resistor when the corresponding key is pressed. The resistance value of that resistor varies based on the forced applied by the user to the key. FIG. 2 is a partially schematic cross section of a key and related keyboard components according to one embodiment of the invention. The cross section of FIG. 2 is taken perpendicular to a column conductor. However, a cross section taken perpendicular to a row conductor would be substantially similar. Shown on the bottom is a row conductor 14 attached to an insulating row substrate 12. Situated on the row conductor is a Force Sensing Resistor (FSR) 16. Various materials are available for use as FSR 16. In one embodiment, FSR 16 is formed from polyethylene having intermixed conductive carbon particles. Other FSR materials include semiconductor/metallic combinations. Situated above FSR 16 is a spacer sheet 18, above which rests column conductor 22 (attached to an insulating column substrate 24). Located above column substrate 24 is an elastomeric dome switch 26, which is in turn located under key 28. When a user presses key 28, dome 27 of dome switch 26 collapses and plunger 29 on the underside of dome 27 forces column conductor 22 into contact with FSR 16 through an opening 20 in spacer sheet 18. A resistive conductive path is thereby formed between column conductor 22 and row conductor 14 through FSR 16; the value of that resistance depends upon the amount of force the user applies to key 28. In one preferred embodiment, FSR 16 is formed so that, for key forces between 10 and 500 grams, the resistance of FSR 16 varies between 1 MΩ and 1 kΩ, respectively (i.e., resistance decreases for increasing key force). In other embodiments, and as shown in FIG. 2A, a solid elastomeric dome switch 26' is used.

Figure 3:
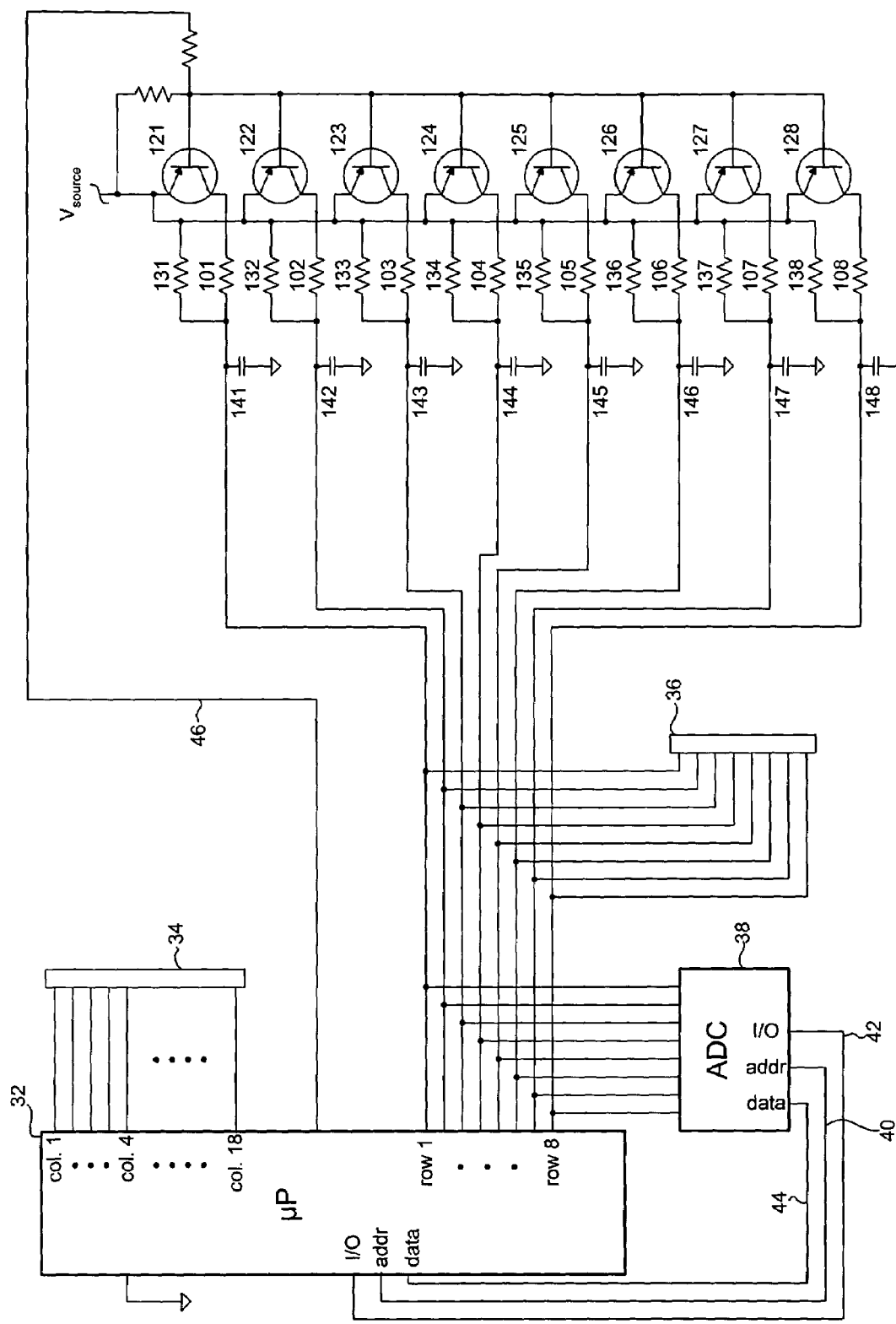
FIG. 3 is a schematic diagram of a keyboard circuit according to at least one embodiment of the invention.

FIG. 3 is a schematic diagram of a circuit for a keyboard according to one embodiment of the invention. Certain components have been omitted so as not to obscure the drawing with details unnecessary for an understanding of the invention.

The operation of the circuit in FIG. 3 is controlled by microprocessor 32. One example of a microprocessor that can be used in at least one embodiment of the invention is a CY7C64113 full-speed, one-time programmable Universal Serial Bus (USB) microcontroller available from Cypress Semiconductor Corporation of San Jose, Calif. Shown on the upper right side of microprocessor 32 are eighteen "pins" or connections (labeled col. 1 through col. 18, with some connections and labels replaced with a vertical ellipsis) to column conductors of the keyboard conductor grid 10 of FIG. 1. Pins for columns 1 through 18 are coupled to keyboard grid 10 by a suitable connector 34. Shown on the bottom left of microprocessor 32 are eight pins (labeled row 1 through row 8) corresponding to the eight row conductors of grid 10. Pins for rows 1 through 8 are similarly coupled to the corresponding row conductors of grid 10 by a suitable connector 36.

Each row pin is further coupled to a detection sub-circuit formed by a PNP transistor, a capacitor and a pair of resistors. The row 1 pin, for example, is connected via low ohm resistor 101 to the collector of transistor 121, via high ohm resistor 131 to the emitter of transistor 121, and via capacitor 141 to ground. In the embodiment of FIG. 3, capacitors 141-148 are provided for noise reduction and de-bounce purposes. Low ohm resistor 101 has a value on the order of 33 KΩ and high ohm resistor 131 has a value on the order of 2 MΩ (in some embodiments, this value is 10 MΩ). The pin for each of rows 2 through 8 is similarly connected to its own detection sub-circuit. For convenience, the last digit of the reference for each component of the other detection sub-circuits corresponds to the row pin to which it is connected (e.g., the row 8 pin is connected to resistors 108 and 138, to transistor 128 and to capacitor 148). The emitters of transistors 121 through 128 are further connected to source voltage $V_{source}$.

Each row pin is also individually connected to an analog to digital converter (ADC) 38. ADC 38 converts the voltage on each row pin into an 8-bit digital value. ADC 38 is controlled by microprocessor 32. Specifically, microprocessor 32 selects one of the row pins via address line 40. Microprocessor 32 then instructs ADC 38 (via a read signal on I/O clock line 42) to output the digital value of the addressed pin voltage. ADC 38 then serially transmits (via data line 44) the digital value of the voltage on the addressed row as of the time of the read signal. One example of an ADC that can be used in at least one embodiment of the invention is a TLC5401 8-bit analog-to-digital converter with serial control and multiple inputs, available from Texas Instruments Incorporated of Dallas, Tex.

In operation, the circuit of FIG. 3 operates in two modes: scan and measure. When in the scan mode, microprocessor 32 is only determining whether a key has been pressed, and is not attempting to measure the amount of force on a key. When a key press is detected, the microprocessor 32 places the circuit in the measure mode. In the measure mode, the microprocessor obtains a quantified digital value for the force on a key that was identified as pressed during the scan mode.

In scan mode, microprocessor 32 first selects the row 1 pin. A voltage is applied to all row pins via voltage source $V_{source}$. Microprocessor 32 then grounds the col. 1 pin and tests the row 1 pin for a low voltage level. At this point, microprocessor 32 causes transistor 121 therefore behave as an open switch by applying a suitable voltage level to transistor driver line 46. Source voltage $V_{source}$ is applied to the row 1 pin via resistor 131. If the key corresponding to the row 1/col. 1 intersection is not pressed, no connection is made between the row 1 and col. 1 pins, and the voltage on the row 1 pin remains high. If the row 1 pin voltage remains high, microprocessor 32 then ungrounds the col. 1 pin and grounds the col. 2 pin. If the row 1 pin voltage remains high, microprocessor 32 continues to the col. 3 pin. This process continues until a low voltage is detected. If no low voltage is detected (e.g., the user is not currently typing), the process continues through all row and column pin combinations, and then begins again.

Figure 4:
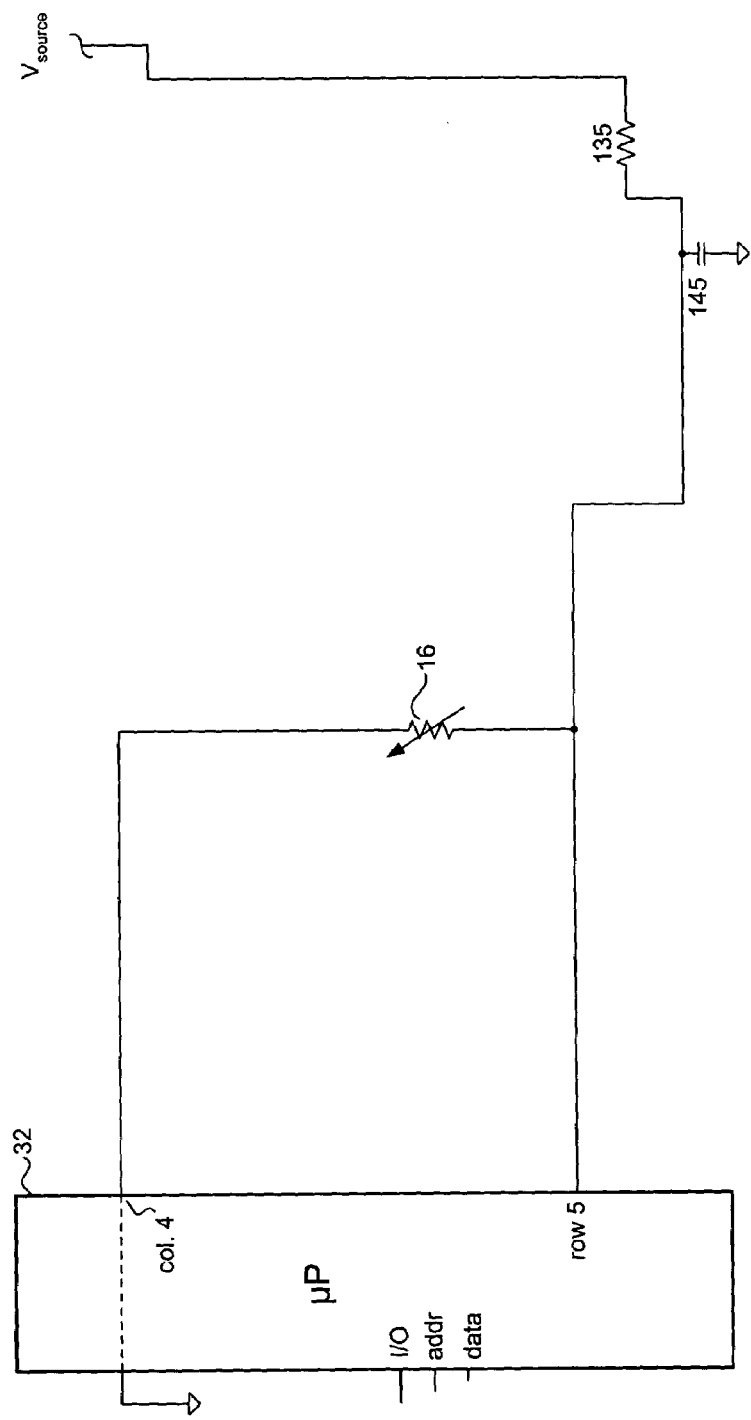
FIG. 4 is another schematic diagram of a keyboard circuit according to at least one embodiment of the invention.

FIG. 4 is a simplified version of FIG. 3 showing an equivalent scan mode circuit when a key is pressed. In the example of FIG. 4, a user is pressing a key corresponding to the intersection of the column 4 and row 5 conductors. When microprocessor 32 ungrounds the previous (col. 3) pin and grounds the col. 4 pin, resistor 135 and FSR 16 of the key (FIG. 2) are placed in series between $V_{source}$ and ground; the row 5 pin is connected to the node between the two resistors (FSR 16 and resistor 135). The two resistors form a voltage divider, and the voltage on the row 5 pin is described by Equation 1:

$$\text{Equation 1:} \quad V_{row\ 5\ pin} = V_{source}\left(\frac{R(16)}{R(16) + R(135)}\right),$$

where $V_{row\ 5\ pin}$ is the voltage on the row 5 pin, R(16) is the resistance of FSR 16 for a particular key force, and R(135) is the resistance of resistor 135. The resistance of resistor 135 is sized so that the voltage on the row 5 pin will go low even for very light key presses. Specifically, resistor 135 (and each of resistors 131, 132, 136, etc.) is sized so that its resistance is at least:

Equation 2: $$R(135) > \left( \frac{R(16)_{lightest} * V_{source}}{V_{low\ logic}} \right) - R(16)_{lightest},$$

where $R(16)_{lightest}$ is the resistance of FSR 16 corresponding to the lightest key force for which a key press will be detected. Notably, the resistance of FSR 16 decreases for heavier key forces. $V_{low\ logic}$ is the voltage level below which microprocessor 32 will treat the voltage on the row 5 pin as a low voltage. If $V_{source}$=5 volts (or −5 volts), a low voltage for microprocessor 32 is between 0.8 volts (or −0.8 volts) and 0 volts, and the resistance for FSR 16 under the lightest key press is 1 MΩ, resistor 135 must have a resistance of at least 5.25 MΩ.

Figure 5:
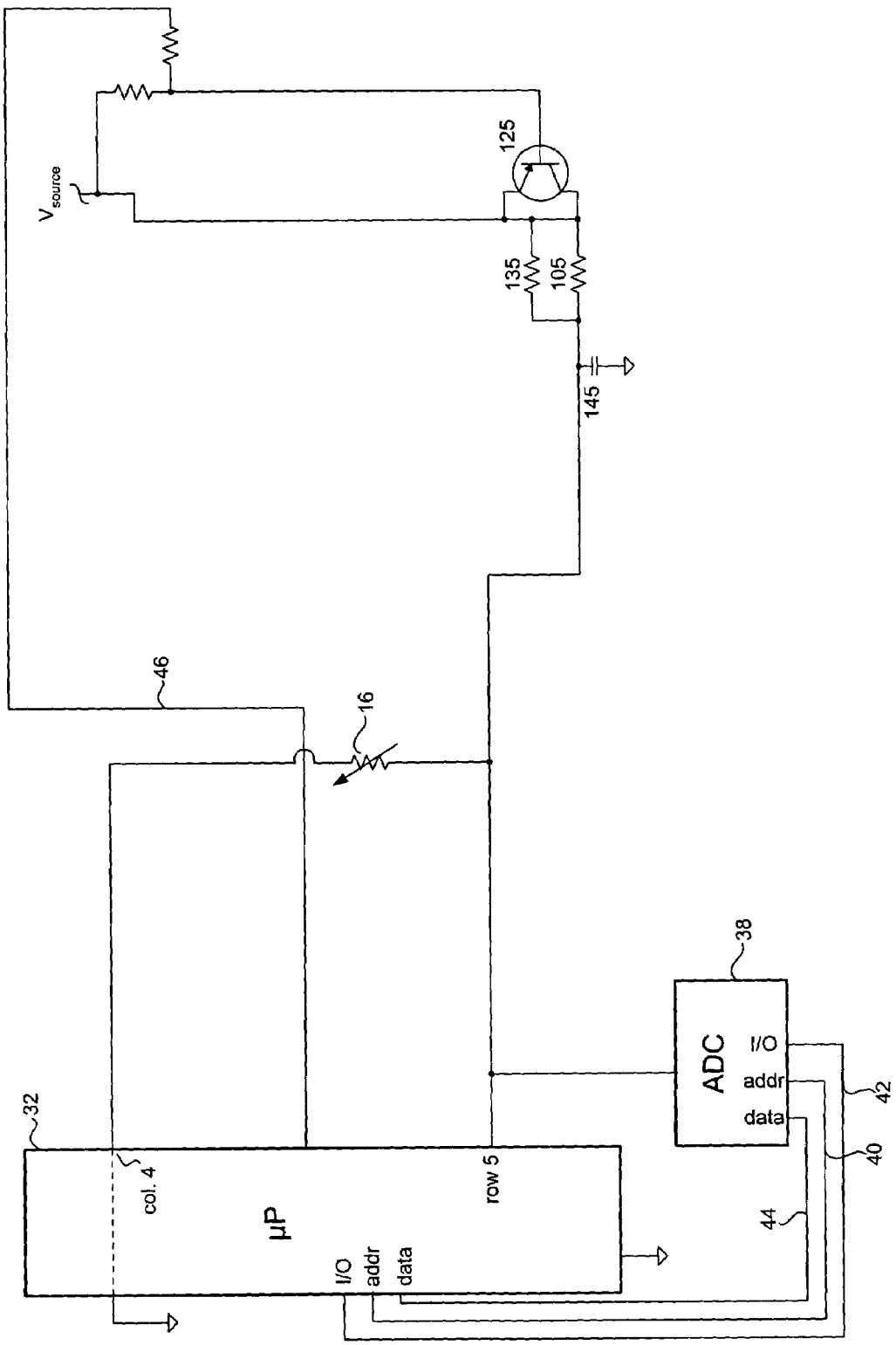
FIG. 5 is another schematic diagram of a keyboard circuit according to at least one embodiment of the invention.

Upon detecting a low voltage on the row 5 pin, microprocessor 32 places the circuit in measure mode and imposes a voltage level on transistor driver line 46 to cause transistor 125 to behave as a closed switch. As shown in FIG. 5, a simplified version of FIG. 3 showing an equivalent circuit for measure mode, resistor 135 and resistor 105 are placed in parallel. Ignoring voltage drop through transistor 125, R(135) in equation 1 is replaced with R(135)*R(105)/[R(135)+R(105)]. If the resistance of resistor 105 is significantly less then the resistance of resistor 135, the equivalent resistance of the parallel resistors is approximately equal to the resistance of resistor 105. If, for example the respective values of resistors 135 and 105 are 10 MΩ and 33 kΩ, the equivalent resistance is 32.9 kΩ.

With the circuit in measure mode, the voltage on the row 5 pin now varies over a wider range. For example, assuming $R(16)_{lightest}$ is 1 MΩ, $R(16)_{heaviest}$ is 1 kΩ, and respective values for resistors 135 and 105 of 10 MΩ and 33 kΩ, the row 5 pin voltage varies between the values shown in Table 1:

TABLE 1

| key force | circuit mode | row pin voltage |
|---|---|---|
| lightest | scan (transistor OFF) | 0.45 volts |
| heaviest | scan (transistor OFF) | 0.0005 volts |
| lightest | measure (transistor ON) | 4.84 volts |
| heaviest | measure (transistor ON) | 0.15 volts |

As seen in Table 1, the voltage on a row pin in the circuit of FIGS. 3-5 has a response range of 0.4495 volts when in the scan mode. When in the measure mode, however, a row pin has a response range of 4.69 volts. By increasing the response range when measuring the voltage on a row pin (and thus measuring the force on a corresponding key), ADC 38 is able to more accurately quantify a larger range of force values.

While in measure mode, microprocessor 32 instructs ADC 38 provide the digital value of the row 5 pin voltage. Specifically, microprocessor 32 provides the address for the row 5 pin (via address line 40) and a read signal (via I/O line 42). ADC 38 then outputs the digital value of the row 5 pin voltage on data line 44. Microprocessor stores an identifier for the pin and the digital voltage value from ADC 38, then returns the circuit to scan mode and proceeds to test the next row/column combination for a low voltage. In another key press is detected, microprocessor 32 returns the circuit to measure mode, obtains a force measurement as just described, stores the pressed key and a force value, and then returns to scan mode to complete scanning of all keys.

In other embodiments, circuit configurations other than a voltage divider could alternatively be employed for measuring a change in resistance of a FSR in response to application of force. As one example, the FSR of a pressed key could be coupled as a resistor in a feedback loop of an operational amplifier (op amp) so as to form a differential amplifier. Although use of one or more op amps could increase circuit cost, a more linear force/resistance curve could be obtained.

Figure 6:
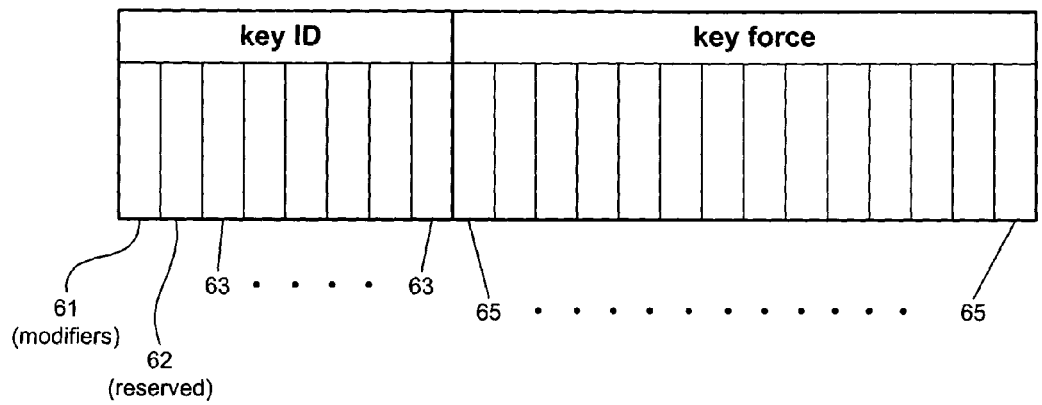
FIG. 6 is a block diagram of a Human Interface Device (HID) report.

After scanning all keys, microprocessor 32 inserts the identity of the pressed key(s) and the corresponding force value(s) into a data message. In at least one preferred embodiment, that data message is in the form of a Human Interface Device (HID) report generated in compliance with the Device Class Definition for Human Input Devices, the Universal Serial Bus (USB) Specification, the USB HID Usage Tables, and other related documents available from the USB Implementers Forum, Inc. at <http://www.usb.org>. One possible format for such an HID report is shown in FIG. 6. Each of boxes 61 through 65 represents a 1-byte value. Box 61 contains eight bits that represent the states of eight modifier keys (left control, left shift, left alt, left GUI, right control, right shift, right alt, right GUI). A "0" in a bit position indicates the modifier key corresponding to that bit position is not pressed, and a "1" indicates that the corresponding modifier key is pressed. Box 62 is a reserved field. Boxes 63 can each contain an identifying code for another key on keyboard 2. The code(s) in box(es) 63 can be, e.g., keyboard page usage IDs as set forth in the USB HID Usage Tables. Boxes 65 contain 1-byte values for the amount of force applied to the keys identified as pressed in boxes 61 and 63. In one embodiment of the invention, force values between 0000 0001 (decimal 1) and 1111 1111 (decimal 255) represent a relative force applied to a key. A value of 1 represents the lowest force value detectable by the key, and 255 represents the maximum force reportable by the key (i.e., application of further force does not cause the force data value to change). A value of 0000 0000 is a null force value, and indicates that a key is not able to quantify the force applied to the key. In some keyboards, for example, less than all of the keys may be force-sensing. By inserting a null force value into the HID report for that key, a computer receiving that HID report is able to discriminate between force-sensing and non-force-sensing keys. Microprocessor 32 could be configured to insert a zero force value if a key press is detected on a key known (by programming of microprocessor 32) not to be a force-sensing key.

Figure 7:
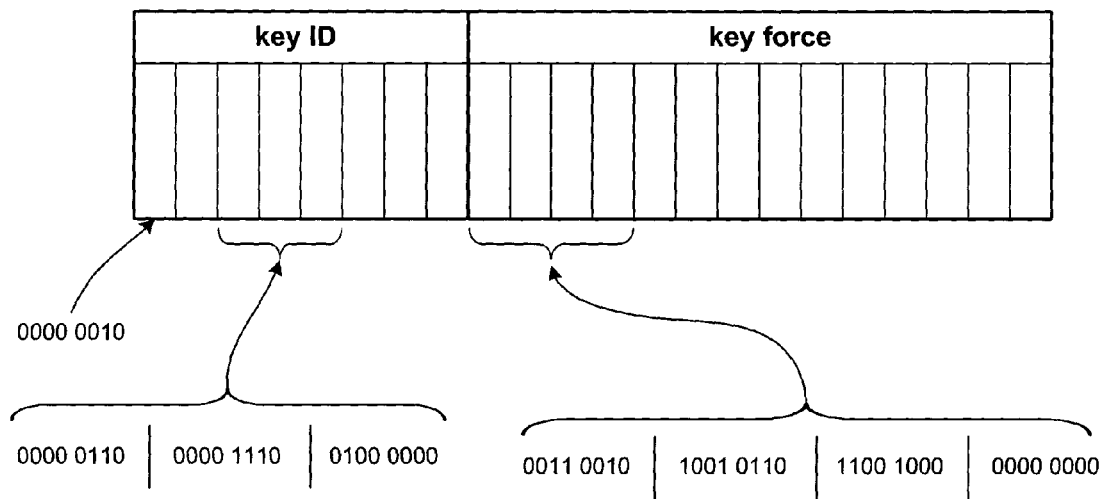
FIG. 7 is a more specific example of an HID report.

FIG. 7 is a more specific partial example of an HID report using the format of FIG. 7. The report of FIG. 8 indicates (with keyboard page usage IDs from the USB HID Usage Tables) that the right alt, C and K keys are pressed with respective force values of 50, 150 and 200. The report of FIG. 7 further indicates that the F7 key is pressed, but that it is not a force-sensing key. In at least one embodiment, key force values (boxes 65 in FIG. 7) are in the same order as their corresponding key identifiers (boxes 61 and 63). In the embodiment of FIGS. 6 and 7, up to 14 separate keys can be reported in a single HID report. The HID report format of FIGS. 6 and 7 is not the only possible report format. As described in the previously-mentioned USB documentation, an HID report descriptor from the keyboard could specify a different format for keyboard data.

Figure 8:
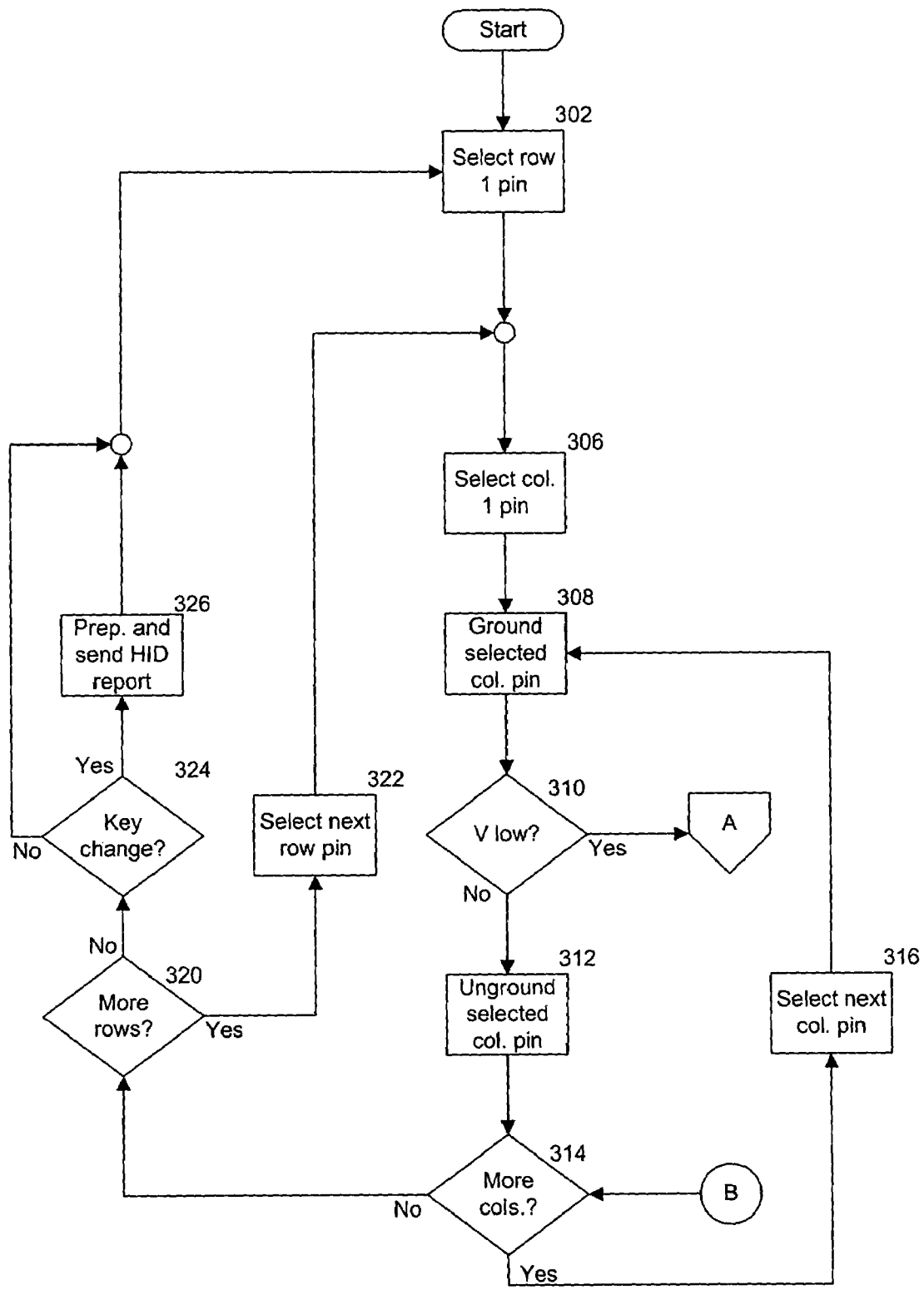
FIG. 8 is a flow chart showing operation of the circuit of FIG. 3 according to at least one embodiment of the invention.
Figure 9:
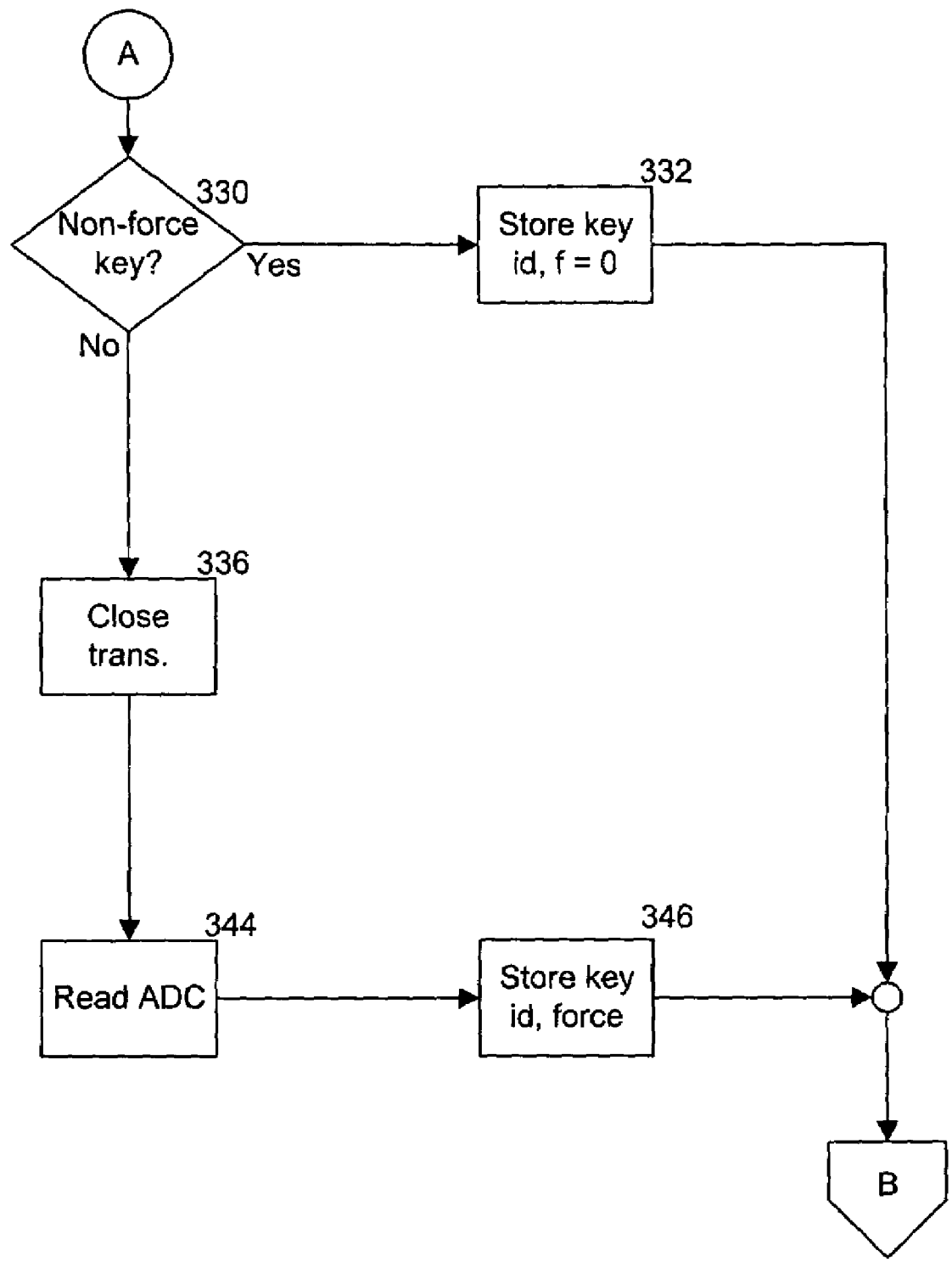
FIG. 9 is a continuation of the flow chart of FIG. 8.

FIGS. 8 and 9 are flow charts showing operation of keyboard circuit of FIG. 3 according to at least one embodiment of the invention. After starting, microprocessor 32 first selects the row 1 pin at block 302. At block 306, microprocessor 32 selects the col. 1 pin. At block 308, the selected column pin is grounded. At block 310, microprocessor 32 determines whether the voltage on the selected row pin has reached a low level. If yes, microprocessor 32 proceeds, via off-page connector A, to block 330 (FIG. 9). At block 330, microprocessor 32 determines if the key corresponding to the selected row and column pins is a non-force-sensing key. If yes, microprocessor 32 proceeds to block 332 and stores the key identifier with a force value of zero, and then returns (via off-page connector B) to block 314 (FIG. 8). If the key corresponding to the selected row and column pins is a force-sensing key, microprocessor 32 drives transistor line 46 so as to cause the appropriate transistor to act as a closed switch (block 336). At block 344, microprocessor 32 then reads from ADC 38 the digital value of the voltage on the selected row pin. At block 346, microprocessor 32 stores the identifier for the key corresponding to the selected row and column pins and the force value from the ADC. Microprocessor 32 then returns to block 314 (FIG. 8) at off-page connector B.

If the voltage does not reach a low level at block 310 (FIG. 8), microprocessor 32 ungrounds the selected column pin at block 312. At block 314 microprocessor 32 determines if there are more columns to be tested (e.g., selected column pin≠col. 18). If yes, the next column pin is selected at block 316 (e.g., col.=col.+1), and microprocessor 32 returns to block 308. If no, microprocessor 32 determines at block 320 whether there are remaining rows in the current keyboard scan (e.g., selected row pin≠row 8 ). If yes, the next row pin is selected at block 322 (e.g., row=row+1), and microprocessor 32 returns to block 306. If no, microprocessor 32 proceeds to block 324. At block 324, microprocessor 32 determines if the just-completed keyboard scan showed a change in the state of any key since the previous scan. In other words, microprocessor 32 determines whether any previously unpressed keys are now pressed, whether any previously pressed keys are now released, or whether the amount of force on a key has changed. If there has been a change in one or more key states, microprocessor 32 generates an HID report containing key identifier and key force (even if force=0) data for all currently down keys at block 326, and transmits that report to a computer. From block 326, microprocessor returns to block 302. If no change in key state was detected at block 324, microprocessor 32 returns to block 302 without generating a report at block 326.

Figure 10:
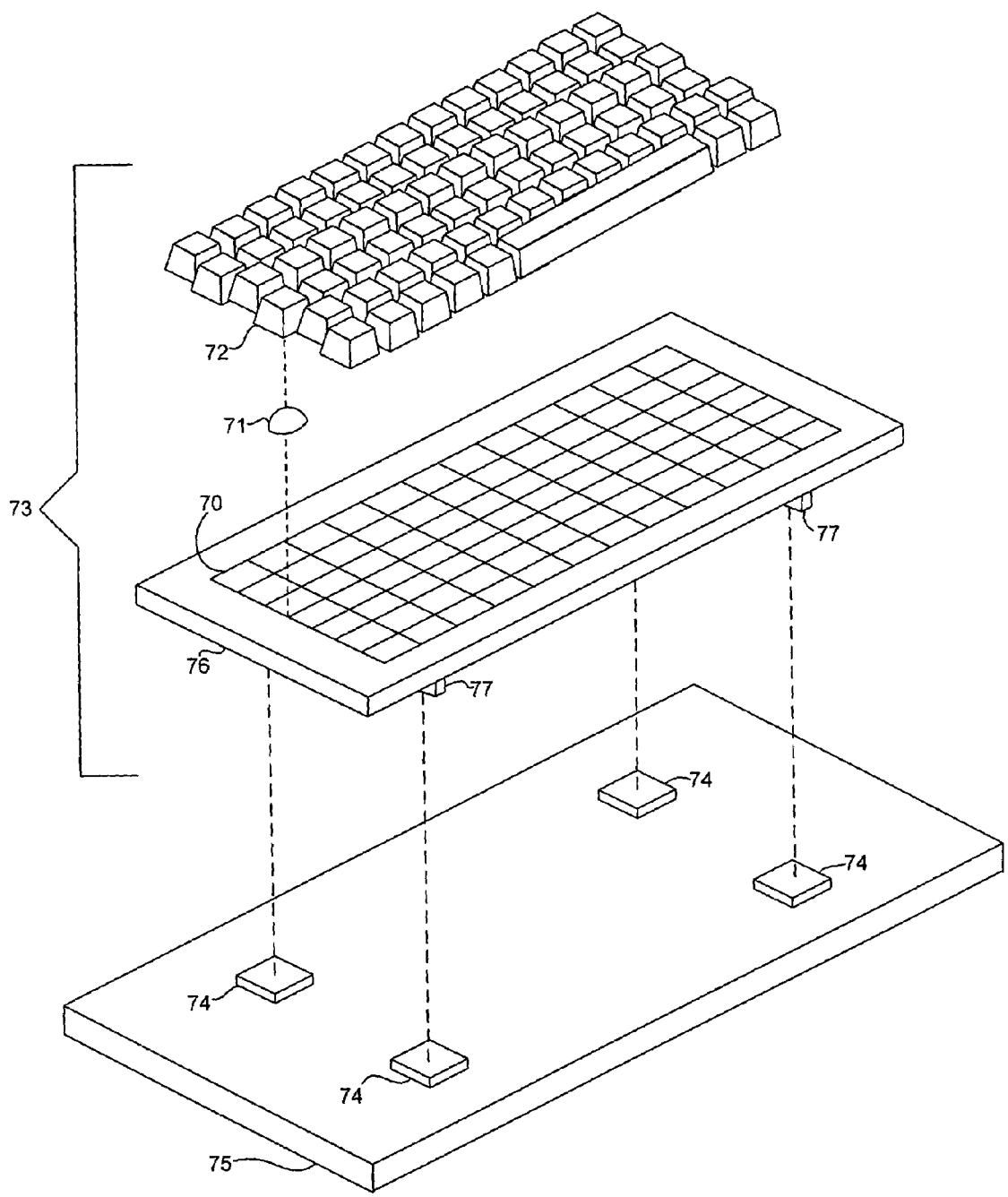
FIG. 10 is a partially schematic exploded perspective drawing of a force-sensing keyboard according to another embodiment of the invention.

FIG. 10 is a partially schematic exploded perspective drawing of a force-sensing keyboard according to another embodiment of the invention. In the embodiment of FIG. 10, each key need not have the capability to quantitatively measure the force exerted upon it. Instead, a keyboard subassembly is supported by one or more force sensors. The identity of a pressed key is determined by identifying the key corresponding to a row and column intersection on a keyboard grid. The force on the key is then determined by the force exerted upon the supporting force sensors.

As shown in FIG. 10, a keyboard according to the second embodiment of the invention also includes a grid 70 of row and column conductors. Grid 70 is supported by a frame 76. Placed over each row/column intersection of grid 70 is a dome switch 71 (only one dome switch shown) and a key 72. Dome switch 70 could be, e.g., similar to switch 26 (FIG. 2) or switch 26' (FIG. 2A). Grid 70, frame 76 switches 71 and keys 72 form keyboard subassembly 73. When a user presses one of keys 72, the dome of the key's dome switch 71 causes an electrical connection to be formed between the row and column conductors over whose intersection the key and switch are positioned. Unlike grid 10 of FIG. 1, the row/column intersections of grid 70 do not include a FSR. Existing dome switches used in conventional keyboards can be employed.

Figure 11:
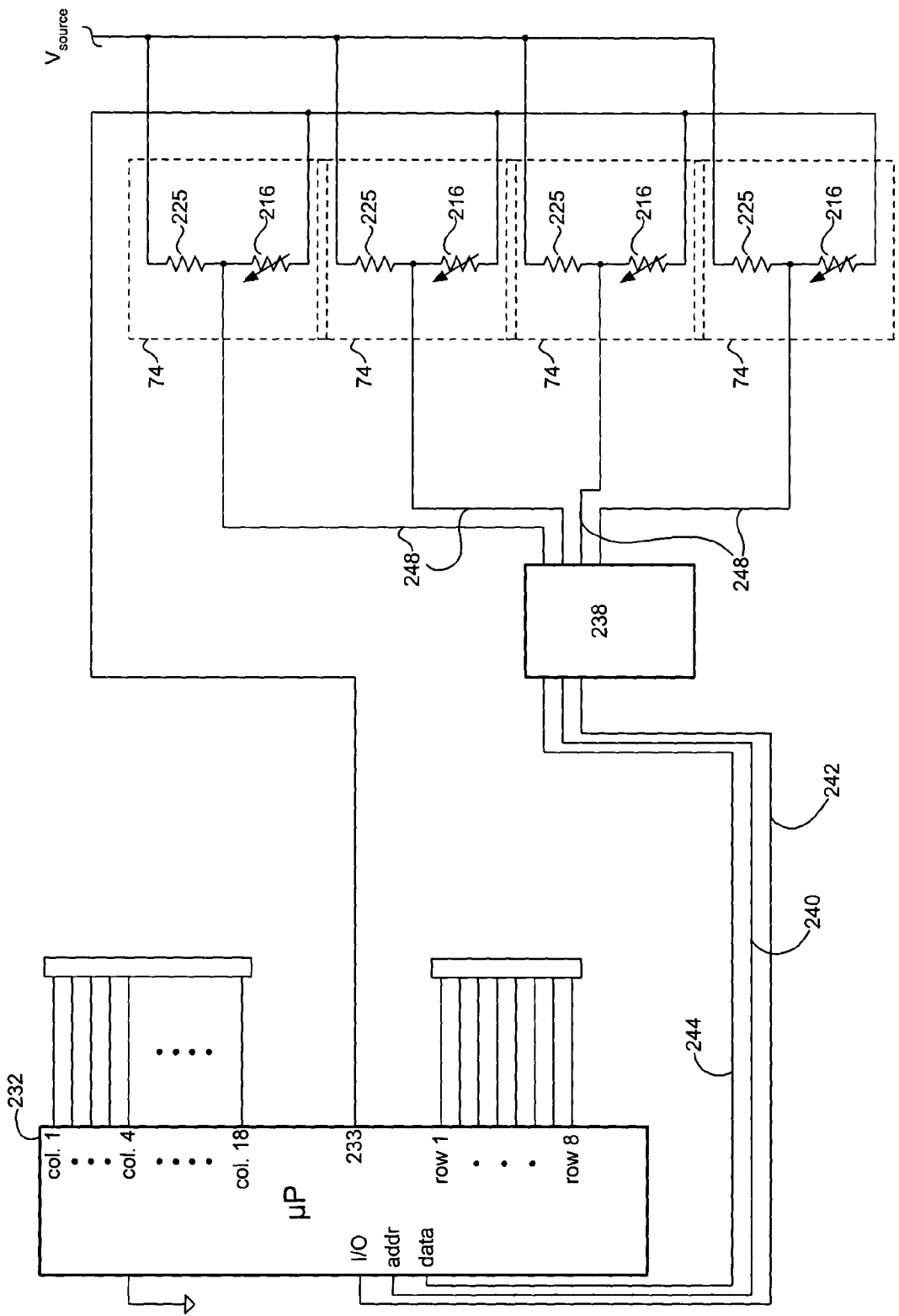
FIG. 11 is a schematic diagram of a keyboard circuit according to another embodiment of the invention.

Instead of detecting key force by measuring force at the level of the individual keys, the force upon a pressed key is determined by force sensors 74 supporting keyboard subassembly 73 on keyboard base 75. In one embodiment, frame 76 has a pair of ribs 77 running along the bottom surface of frame 76. Those ribs rest upon sensors 74. When a key is pressed, the downward force on the pressed key is transferred through subassembly 73 to force sensors 74. Although four force sensors are shown in FIG. 11, a greater or lesser number can be used. In some embodiments, force sensors 74 also measure force by using a FSR material. However, other known types of force sensors can be used, including a strain gauge with a resistive bridge and/or a piezo-electric device.

Figure 12:
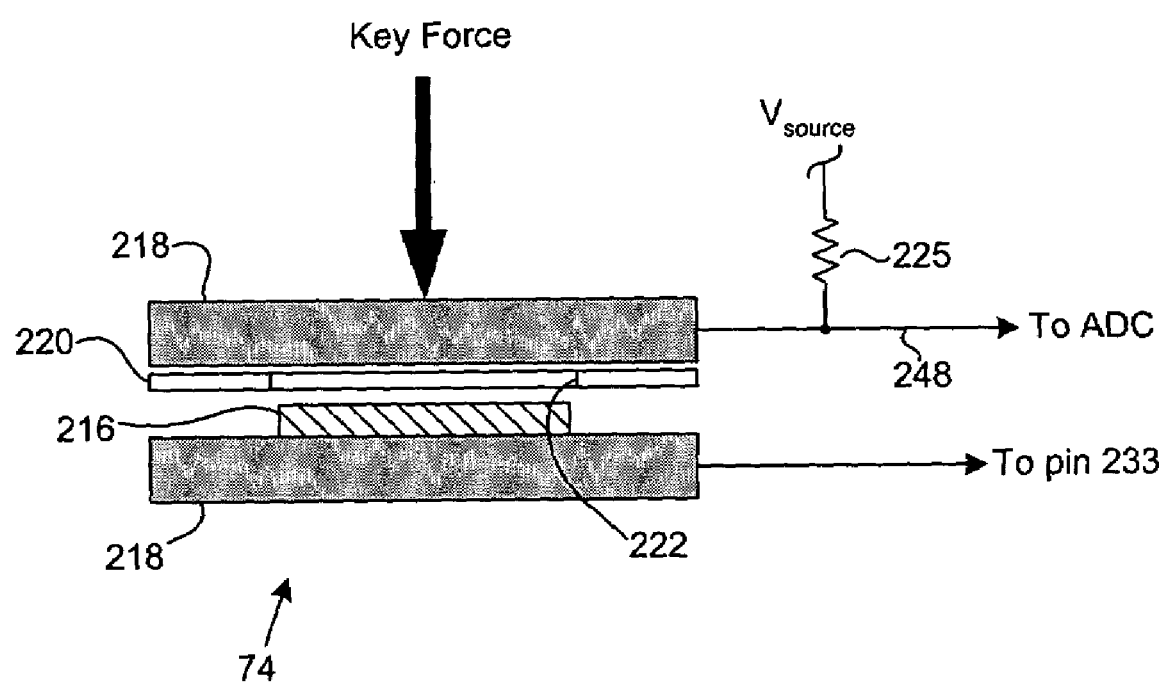
FIG. 12 is a block diagram of a force sensor according to another embodiment of the invention.

FIG. 11 is a block diagram for a circuit of the keyboard of FIG. 10. Similar to the embodiment of FIG. 3, the embodiment of FIG. 11 is controlled by a microprocessor 232. Microprocessor 232 could be the aforementioned CY7C4113 device. As in the previous embodiment, microprocessor 232 includes pins for connection to the row and column conductors of grid 70. Each of force sensors 74 comprises, as shown in FIG. 12, a FSR material 216 situated between conductors 218. Spacer 220 separates the upper conductor 218 from FSR material 216, which in turn rests on bottom conductor 218. When downward force is applied (shown by the arrow in FIG. 12), upper conductor 218 is forced into contact with FSR material 216 through a hole 222 in spacer 220. The resistance value of FSR material 216 varies in relation to the amount of applied force. One conductor of force sensor 74 is connected to source voltage $V_{source}$ via resistor 225 and the other is connectable to ground via pin 233 of microprocessor 232 (FIG. 11). Microprocessor 232 selectively grounds and ungrounds pin 233. Resistor 225 is sized so as to form a voltage divider of suitable range. Force sensor 74 transmits a return signal to the circuit of FIG. 11 via return line 248. When force is exerted on force sensor 74, source voltage $V_{source}$ is connected via FSR material 216 to ground. ADC 238 could be the aforementioned TLC5401.

Similar to the first embodiment, microprocessor 232 scans for a key press by selecting a row pin, grounding a column pin, testing the selected row pin for a low voltage, and then ungrounding the column pin and moving to the next column pin. After all column pins for a selected row pin have been tested, the next row pin is selected, and the process continues. Upon detecting a low voltage on a row pin, microprocessor 232 grounds pin 233. Force sensors 74 are only connected to ground when a key press is detected so as to avoid excessive power consumption by force sensors 74. Microprocessor 232 then sequentially addresses each force sensor 74 (via address line 240), sends a read signal via I/O clock line 242, and receives digital values for a voltage from each force sensor 74 via data line 244. The read values are then used as a force value for the pressed key. In other embodiments, the FSR 216 of one or more force sensors 74 could be coupled to an op amp instead of being used to form a 2-resistor voltage divider. As previously discussed in connection with the embodiment of FIG. 3, FSR 216 could be coupled as a resistor within the feedback loop of an op amp to form a differential amplifier.

If only a single key is pressed, the voltages from force sensors 74 can be summed to obtain the force upon the pressed key. If more than one key is pressed, the digital values from each force sensor and the distances of the pressed keys from each sensor (known because each key location is known) can be used to estimate the force upon each of the individual keys identified as pressed. If several keys are pressed simultaneously, the forces on the individual keys can be computed using the individual values of forces from the force sensors 74 and the known distance of each pressed key from the force sensors. If two keys are pressed together, for example, the center of force can be determined based on the relative measurements from the force sensors. That center of force will lie somewhere along a line between the two pressed keys. The known locations of the keys relative to the center of force and the total force can then be input into one or more additional algorithms to calculate the relative force on each key. Similarly, if three keys are pressed simultaneously, the center of force can be determined based on the relative forces on each sensor. The center of force will lie somewhere in a triangle formed by the pressed keys, and the forces on each can be determined based on the known locations of the keys relative to the center of force and upon the total force.

In other embodiments of the invention, key location (and thus key identity) can be determined solely on force data from force sensors. In particular, the output of the sensors can be input into an algorithm that calculates the location of the center of the downward force on the keyboard. If it is assumed that only one key is being pressed, that location can be mapped (via, e.g., a lookup table) to the appropriate key.

Figure 13:
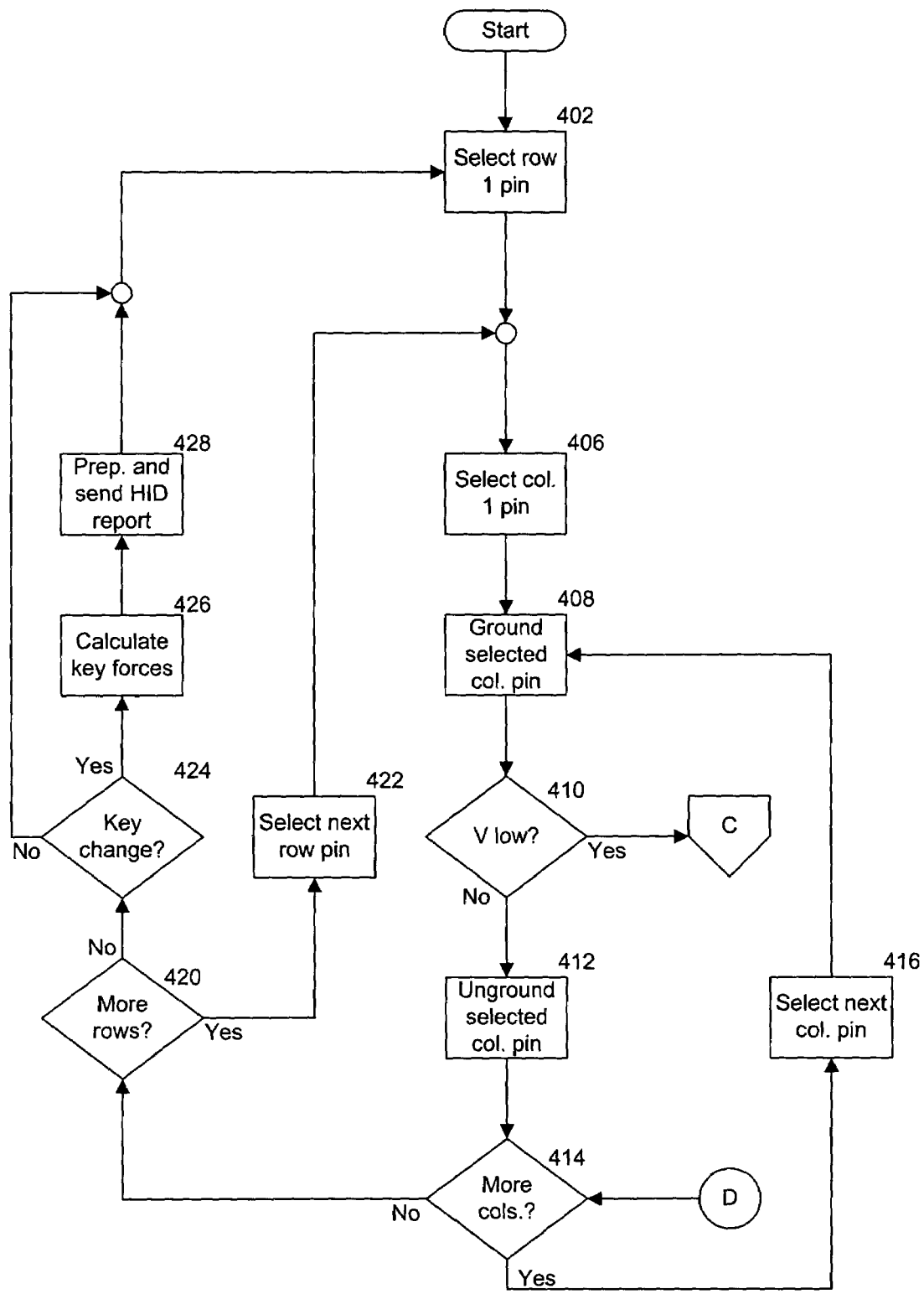
FIG. 13 is a flow chart showing operation of the circuit of FIG. 11 according to at least one embodiment of the invention.
Figure 14:
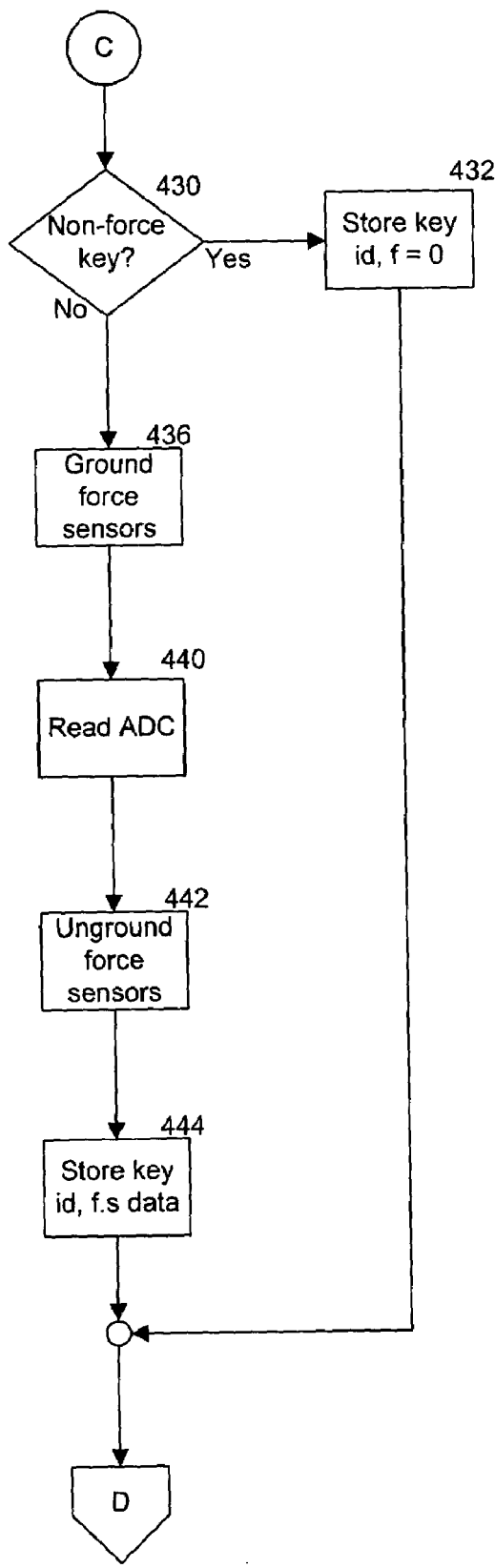
FIG. 14 is a continuation of the flow chart of FIG. 13.

FIGS. 13 and 14 are flow charts showing operation of the keyboard circuit of FIG. 11 according to at least one embodiment of the invention. After staring, microprocessor 232 selects the pin for row 1 at block 402. At block 406, microprocessor 232 selects the pin for column 1. At block 408, microprocessor 232 grounds the selected column pin. At block 410, microprocessor 232 determines whether the voltage on the selected row pin has reached a low level. If yes, microprocessor 232 proceeds, via off-page connector C, to block 430 (FIG. 14). At block 430, microprocessor 232 determines if the key corresponding to the selected row and column pins is not associated with force sensing. For example, and although not shown in FIG. 10, some rows and columns could be part of a physically separate grid that is not located on frame 76; in such case, the force on the key might not be measurable by force sensors 74. If the key corresponding to the selected row and column pins is not associated with force sensing, the identifier for the key and a zero force value are stored at block 432, and microprocessor 232 returns to block 414 (FIG. 13) via off-page connector D. If the key is on grid 70 and frame 76, microprocessor 232 grounds the force sensors at block 436. At block 440, microprocessor 232 reads the values of force sensors 74 from ADC 238. After ungrounding the force sensors at block 442, the key identifier and force data values from force sensors 74 are stored at block 444. Microprocessor 232 then returns to block 414 (FIG. 13) via off-page connector D.

If the voltage on the selected row pin does not reach a low level at block 410, microprocessor 232 ungrounds the selected column pin at block 412 and determines at block 414 if there are any remaining columns (e.g., selected column pin≠col. 18). If yes, microprocessor 232 selects the next column pin (e.g., col.=col.+1) at block 416 and returns to block 408. If no, microprocessor 232 determines at block 420 whether there are any remaining rows in the current keyboard scan (e.g., selected row pin≠row 8). If yes, microprocessor 232 selects the next row pin (e.g., row=row+1) at block 422 and returns to block 406. If no, microprocessor 232 determines at block 424 whether there has been a change in a key state since the preceding keyboard scan. Specifically, microprocessor determines whether a previously down key is now up, whether a previously up key is now down, or whether the force data from force sensors 74 has changed. If no change has occurred, microprocessor 232 returns to block 402. If a change has occurred, microprocessor 232 calculates the forces on the down keys (e.g., summing values from force sensors 74 if only one key is pressed, or apportioning the values from force sensors 74 if more than one key is pressed) at block 426. Microprocessor 232 then prepares an HID report at block 428 and transmits same, and then returns to block 402.

Figure 15:
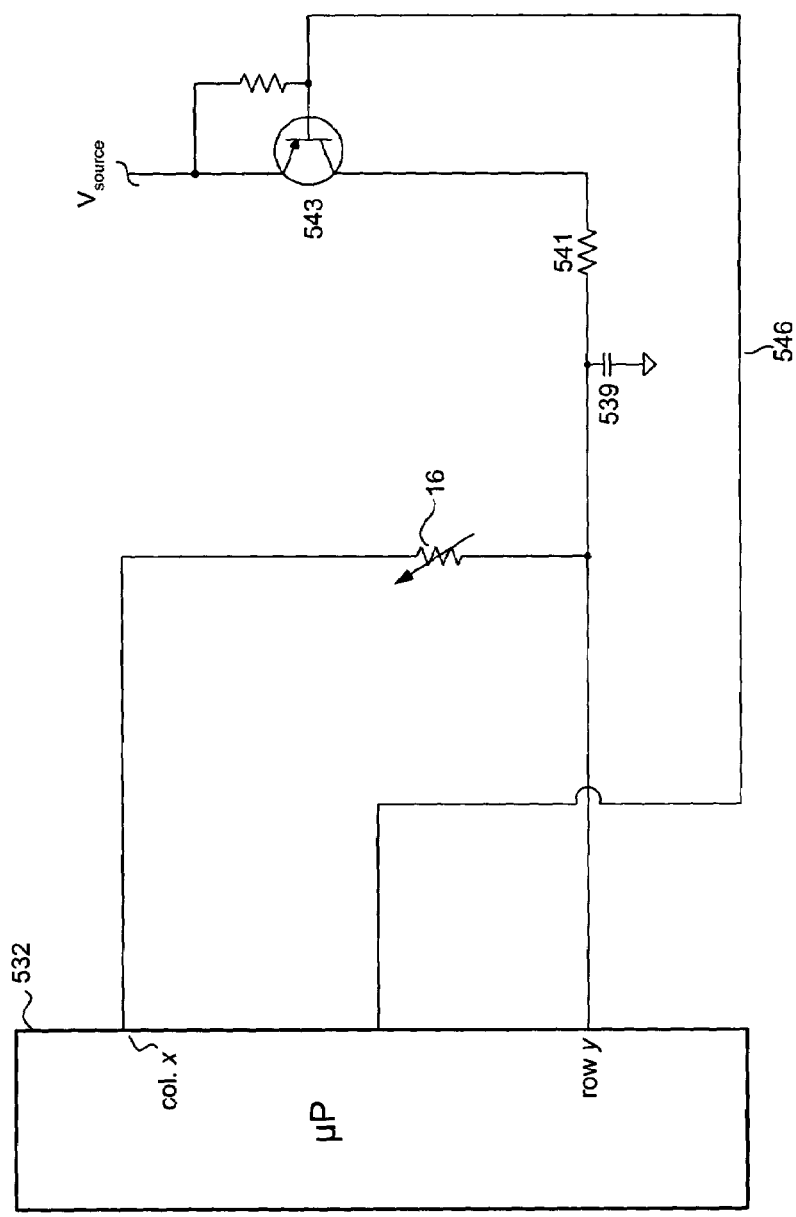
FIG. 15 is a block diagram of a keyboard circuit according to another embodiment of the invention.

FIG. 15 is a partially schematic block diagram of an alternate embodiment of a circuit for a keyboard in which force sensors are implemented at the key level, as shown in FIG. 2. For simplicity, components are only shown for a single row (row y) and a single column (col. x). In FIG. 15, each row pin of microprocessor 532 is connected to source voltage $V_{source}$ (via a resistor 541 and a transistor 543) and a capacitor 539. Although not shown, there would be a similar network of a capacitor 539, resistor 541 and transistor 543 coupled to each row pin, and each transistor base coupled to a driver line 546. Resistor 541 has a high resistance value (e.g., 10MΩ). When in scan mode, microprocessor 532, via driver line 546, causes transistor 543 to act as a closed switch. In this configuration, resistor 541 and FSR 16 function as a voltage divider. Similar to the embodiment of FIG. 3, the resistance value of resistor 541 and of FSR 16 (when lightly pressed) are such that, for light presses of a key, the voltage of the row y pin drops to a sufficiently low threshold level so as to detect a key press. In scan mode, the embodiment of FIG. 15 functions similar to the embodiment of FIG. 3. Specifically, a row pin is selected, each column line is selectively grounded, and the selected row pin tested for a low voltage as each column pin is grounded.

When a key press is detected (i.e., when the voltage on the selected row pin reaches a low level), microprocessor 532 places the circuit in measure mode. Driver line 546 is driven so as to cause transistor 543 to behave as an open switch, and source voltage $V_{source}$ is no longer connected to capacitor 539 via resistor 541. The selected row pin (row y in this case) is grounded so as to completely discharge capacitor 539. Microprocessor 532 then returns the row pin to a high impedance condition, and places into a high voltage condition the column pin (here, pin x) for which a key press was detected. An RC circuit is thereby formed from the high voltage on the col. x pin through FSR 16 and capacitor 539 to ground. The time constant for this circuit varies based on the resistance value of FSR 16, which in turn varies with the force applied to the pressed key.

Figure 16:
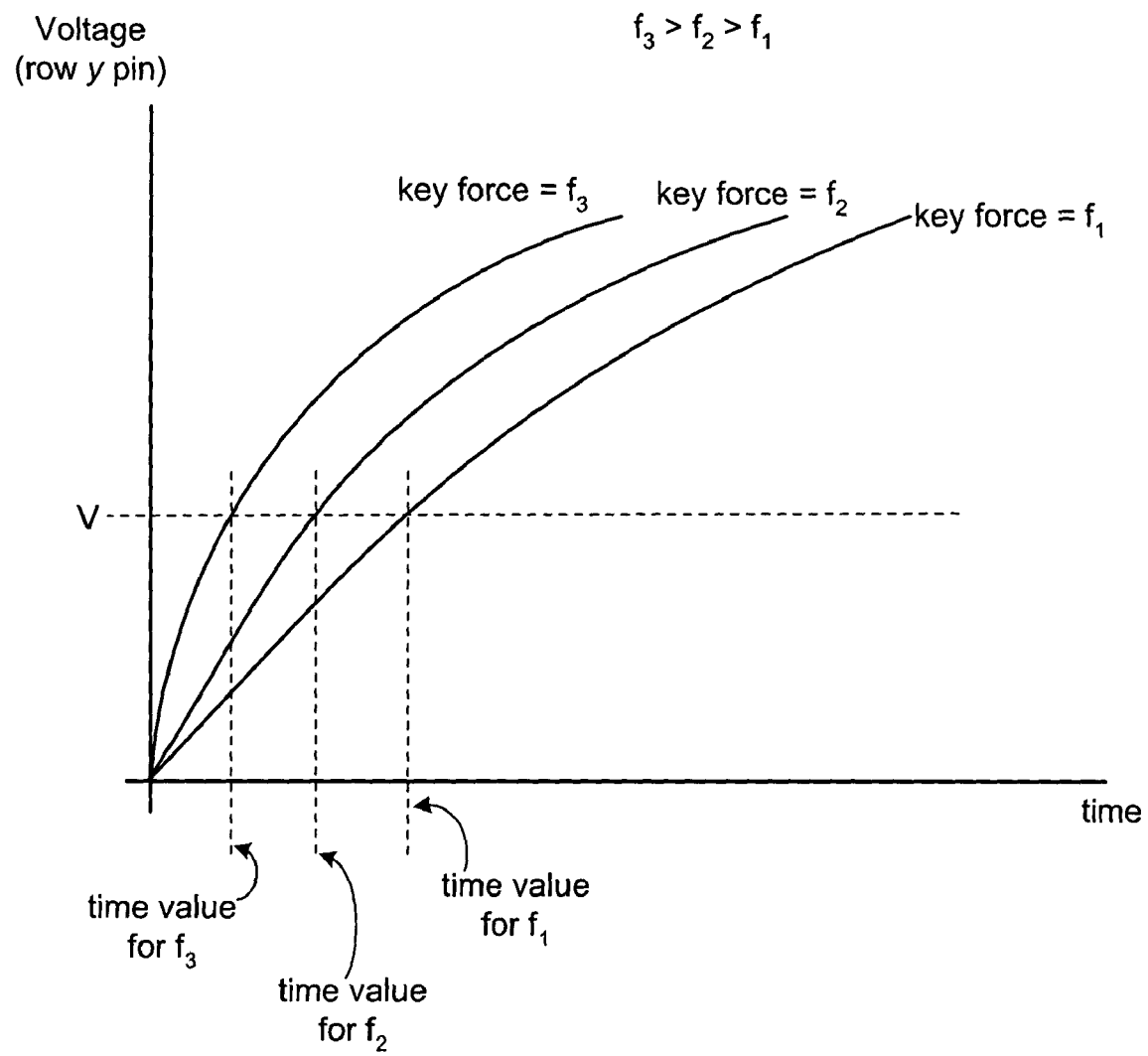
FIG. 16 is a graph showing measurement of key force according to another embodiment of the invention.

Simultaneously with placing the col. x pin in a high voltage condition, microprocessor 532 starts a timer. When the voltage on the row y pin reaches a predetermined level, microprocessor stops the timer and stores the timer value. As shown in FIG. 16, the timer value to reach a predetermined voltage level V will vary based on the amount of force applied. When a light force is applied to a pressed key (e.g., $f_1$), the RC time constant will be relatively large, and more time will be required to reach the preset voltage V. When a heavier force is applied to the pressed key (e.g., $f_3$), the RC time constant will be relatively small, and less time will be required to reach the preset voltage V.

After detecting the voltage V on the row y pin, microprocessor 532 stores an identifier for the pressed key and the timer/force value. Microprocessor 532 then returns the circuit to scan mode and proceeds to the next row/column combination. After all combinations have been scanned (and measured, if appropriate), the pressed keys and associated force data are used to generate a report in a manner similar to that described with regard to the circuit of FIG. 3. Microprocessor 532 then begins a new scan cycle.

Although specific examples of carrying out the invention have been described, those skilled in the art will appreciate that there are numerous variations and permutations of the above described systems and techniques that fall within the spirit and scope of the invention as set forth in the appended claims. As but one example of such a variation, a keyboard grid according to the invention may have a greater or lesser number of rows or a greater or lesser number of columns. As but another example, the embodiment of FIG. 11 could be combined with the embodiment of FIG. 15. In particular, FSR 216 of one or more force sensors 74 could be coupled to ground via a capacitor, and microprocessor 232 used to measure the time for a node of the one or more force sensors to reach a predetermined voltage. Many of the described components can be combined, rearranged or otherwise modified. Various steps of operation can also be modified, combined or rearranged. These and other modifications are within the scope of the invention as defined by the attached claims.

The invention claimed is:

1. A computer keyboard, comprising:
a plurality of keys, each key of the plurality having an unpressed condition in which no force is exerted upon the key by a user and a pressed condition in which force is exerted on the key by a user;
a force detection circuit configured to
scan each key of the plurality to determine if a scanned key is in a pressed condition,
quantify, upon determining that a scanned key is in a pressed condition, the force exerted by a user on said key determined to be in a pressed condition, and
proceed, upon determining that a scanned key is not in a pressed condition, to another key of said plurality without quantifying a force exerted on the key determined not to be in a pressed condition;
a first group of conductors;
a second group of conductors positioned in close proximity to the first group of conductors, the first and second groups of conductors forming a plurality of intersections between first group conductors and second group conductors; and
a force sensitive resistive element located between the first group conductor and the second group conductor of each of the plurality of intersections, wherein
each of the plurality of intersections corresponds to an associated key of the plurality of keys, each of the associated keys configured to compress the resistive element located at the corresponding intersection upon exertion of force on the associated key,
the force detection circuit is configured to quantify force exerted upon each of the associated keys based upon changes in resistance value of the resistive element at each corresponding intersection,
the force detection circuit comprises a microprocessor and a voltage divider, and
the microprocessor is configured to place the voltage divider in a first condition when scanning each key of the plurality to determine if a scanned key is in a pressed condition and in a second condition when quantifying the force exerted by a user on a key determined to be in a pressed condition.

2. The computer keyboard of claim 1, wherein the plurality of keys includes multiple character keys having respective characters assigned thereto and a plurality of modifier keys, and wherein the microprocessor is configured to generate a first signal upon detecting a character key to be in a pressed condition and to generate a different signal upon detecting said character key and a modifier key to simultaneously be in a pressed condition.

3. The computer keyboard of claim 1, wherein:
the voltage divider includes a voltage measuring node, when the force detection circuit is in the first condition, voltage at the voltage measuring node varies within a first range as a key is pressed,
when the force detection circuit is in the second condition, voltage at the voltage measuring node varies within a second range as a key is pressed, and
the second range is larger than the first range.

4. The computer keyboard of claim 1, further comprising an Analog to Digital Converter (ADC), and wherein:
the microprocessor determines a scanned key is in a pressed condition when voltage on a tested conductor of the corresponding intersection reaches a threshold value, and
the microprocessor, after determining the scanned key is in a pressed condition, instructs the ADC to output a digital value of a voltage on the conductor 5. The computer keyboard of claim 1, wherein placing the voltage divider in the second condition comprises altering a resistance value in a portion of the voltage divider, said altered resistance value portion not including one of the force sensitive resistive elements.

the microprocessor, after determining the scanned key is in a pressed condition, instructs the ADC to output a digital value of a voltage on the tested conductor.

6. A computer keyboard, comprising
a grid of first group conductors and second group conductors, the first and second group conductors forming a plurality of intersections;
a force-sensitive resistive element at each intersection of the plurality located between one of the conductors of the first group and one of the conductors of the second group forming said intersection;
a plurality of keys located above the plurality of intersections, each key being associated with one intersection and configured to exert force on the conductors and force-sensitive resistive element of the associated intersection during a key press;
a microprocessor having a plurality of first group conductor pins each in contact with one of the first group conductors and a plurality of second group conductor pins each in contact with one of the second group conductors;
a sub-circuit connected to at least one of the second group conductors, the sub-circuit having a resistor network switchable by the microprocessor between a low resistance value and a high resistance value; and
an Analog to Digital Converter (ADC) coupled to the sub-circuit and to the microprocessor.

7. The computer keyboard of claim 6, wherein the microprocessor is configured to:
  ground to an individual conductor pin,
  test another conductor pin for a threshold voltage level while the resistor network is switched to the high resistance value,
  switch the resistor network to the low resistance value upon detecting the threshold voltage level on the tested conductor pin, and
  receive from the ADC a digital value of a voltage on the tested conductor pin while the resistor network is switched to the low resistance value.

8. The computer keyboard of claim 7, comprising a plurality of sub-circuits connected to a plurality of conductors of the second group of conductors.

9. The computer keyboard of claim 7, wherein the microprocessor is configured to:
  store the identity of a plurality of pressed keys and force values associated with the pressed keys, and
  generate a data message containing the identities and associated force values.

10. The computer keyboard of claim 9, wherein the microprocessor is configured to generate the data message in the form of a Human Interface Device (HID) report.

11. The computer keyboard of claim 7, wherein the plurality of keys includes multiple character keys having respective characters assigned thereto and a plurality of modifier keys.

12. The computer keyboard of claim 11, wherein the plurality of keys includes at least 36 character keys.

13. The computer keyboard of claim 7, wherein the microprocessor is configured to:
  sequentially test each key for a key press by grounding a conductor pin connected to one of the conductors forming the associated intersection and testing for the threshold voltage level on the other of the conductors forming the associated intersection, and
  receive, for only the keys for which the threshold voltage level was detected, the digital value from the ADC.

14. The keyboard of claim 13, wherein the microprocessor is configured to generate a data message containing identifiers for multiple keys of the plurality for which the threshold voltage level was detected and digital values from the ADC corresponding to the multiple keys.

15. A microprocessor having preprogrammed instructions for performing steps comprising:
  placing a detection circuit in a first state in which the detection circuit is configured to identity a pressed key of a keyboard;
  selecting, while in the first state, a conductor pin from a group of conductor pins;
  testing, while in the first state, the selected conductor pin for a threshold voltage level;
  upon detecting the threshold voltage level on the selected conductor pin, placing the detection circuit in a second state by altering the resistance of a resistance network;
  when in the second state, receiving a digital value for a voltage on the selected conductor pin, the digital voltage value representing an amount of force applied to the pressed key;
  scanning the keyboard for presses of additional keys by testing for a threshold voltage level with regard to each of the additional keys when the detection circuit is in the first state; and
  placing the detection circuit in the second state and receiving additional digital voltage values upon detection of threshold voltages with regard to the additional keys.

16. The microprocessor of claim 15, having additional preprogrammed instructions for performing steps comprising:
  instructing an Analog to Digital Converter (ADC) to convert a detection circuit voltage to a digital value; and
  reading from the ADC a digital value for the detection circuit voltage.

17. The microprocessor of claim 15 having additional preprogrammed instructions for performing steps comprising:
  storing an identifier for multiple pressed keys;
  storing force measurements for the multiple pressed keys;
  generating a data message containing the stored identifiers and force measurements.

18. The microprocessor of claim 17, wherein said generating a data message comprises generating a Human Interface Device (HID) report.

19. The microprocessor of claim 15 wherein said scanning the keyboard for presses of additional keys comprises testing for a threshold voltage level with regard to at least 35 separate keys.

20. The microprocessor of claim 15, wherein placing the detection circuit in a second state by altering the resistance of a resistance network comprises altering a resistance value in a portion of the resistance network that does not include a force sensitive resistive element.

* * * * *